(12) United States Patent
Jocic et al.

(10) Patent No.: US 11,524,658 B2
(45) Date of Patent: Dec. 13, 2022

(54) WINDSHIELD WIPER DEVICE

(71) Applicant: Robert Bosch GmbH, Stuttgart (DE)

(72) Inventors: Najdan Jocic, Pancevo (RS); Andrija Terentic, Belgrade (RS); Godelieve Kraemer, Huegelsheim (DE); Harald Rapp, Buehl (DE); Hendrik Kraemer, Buehl (DE); Herve Bratec, Wilsele (BE); Michael Kruse, Sinzheim (DE); Nikola Cirkovic, Belgrade (RS); Sascha Geissler, Lichtenau (DE); Sven Wolfgarten, Buehl (DE); Tanja Bosnic, Belgrade (RS)

(73) Assignee: Robert Bosch GmbH, Stuttgart (DE)

( * ) Notice: Subject to any disclaimer, the term of this patent is extended or adjusted under 35 U.S.C. 154(b) by 413 days.

(21) Appl. No.: 16/956,063

(22) PCT Filed: Oct. 18, 2018

(86) PCT No.: PCT/EP2018/078568
§ 371 (c)(1),
(2) Date: Jun. 19, 2020

(87) PCT Pub. No.: WO2019/120685
PCT Pub. Date: Jun. 27, 2019

(65) Prior Publication Data
US 2020/0317161 A1   Oct. 8, 2020

(30) Foreign Application Priority Data

Dec. 19, 2017   (DE) .................... 10 2017 223 140.8

(51) Int. Cl.
*B60S 1/52* (2006.01)
*B60S 1/38* (2006.01)
*B60S 1/40* (2006.01)

(52) U.S. Cl.
CPC ............ *B60S 1/524* (2013.01); *B60S 1/3805* (2013.01); *B60S 1/3858* (2013.01); *B60S 1/3862* (2013.01); *B60S 1/407* (2013.01)

(58) Field of Classification Search
CPC ...... B60S 1/524; B60S 1/3805; B60S 1/3858; B60S 1/3862; B60S 1/407
See application file for complete search history.

(56) References Cited

U.S. PATENT DOCUMENTS 5,676,868 A   10/1997   Simmons
2015/0239435 A1*   8/2015   Caillot .................. B60S 1/3805
                                                15/250.07

FOREIGN PATENT DOCUMENTS

DE   102008049270   4/2010
DE   102009043694   4/2011
(Continued)

OTHER PUBLICATIONS

International Search Report for Application No. PCT/EP2018/078568 dated Jan. 29, 2019 (English Translation, 2 pages).

*Primary Examiner* — Andrew A Horton
(74) *Attorney, Agent, or Firm* — Michael Best & Friedrich LLP (57) ABSTRACT

The invention relates to a windshield wiper device (10a; 10b) for a windshield wiper (12a; 12b), comprising at least one wiper arm adapter (14a; 14b), at least one wiper blade adapter (16a; 16b), and a heating unit (18a; 18b) for heating a wiper blade (20a; 20b) and/or a spray unit (22a; 22b) for spraying a wash fluid onto a vehicle windshield, wherein the spray unit (22a; 22b) and/or the heating unit (18a; 18b) is/are at least partly arranged in the wiper blade adapter (16a; 16b). The wiper arm adapter (14a; 14b) and the wiper blade adapter (16a; 16b) have coupling elements (24a, 26a; 24b, 26b) which are provided for laterally coupling the (Continued)

wiper arm adapter (14*a*; 14*b*) to the wiper blade adapter (16*a*; 16*b*).

20 Claims, 3 Drawing Sheets

(56) References Cited

FOREIGN PATENT DOCUMENTS

| | | |
|---|---|---|
| DE | 102010007557 | 8/2011 |
| EP | 3231673 | 10/2017 |

* cited by examiner

WINDSHIELD WIPER DEVICE

BACKGROUND OF THE INVENTION

A windshield wiper device for a windshield wiper, having at least one wiper arm adapter, having at least one wiper blade adapter, and having a heating unit for heating a wiper blade and/or having a spray unit for spraying a washing fluid onto a vehicle windshield, wherein the spray unit and/or the heating unit are/is arranged at least partially in the wiper blade adapter, has already been proposed.

SUMMARY OF THE INVENTION

The invention proceeds from a windshield wiper device for a windshield wiper, having at least one wiper arm adapter, having at least one wiper blade adapter, and having a heating unit for heating a wiper blade and/or having a spray unit for spraying a washing fluid onto a vehicle windshield, wherein the spray unit and/or the heating unit are/is arranged at least partially in the wiper blade adapter.

It is proposed that the wiper arm adapter and the wiper blade adapter have coupling elements which are provided for lateral coupling of the wiper arm adapter to the wiper blade adapter. The configuration according to the invention of the windshield wiper device makes it possible for particularly simple coupling of the wiper arm adapter to the wiper blade adapter to be achieved. Furthermore, simple assembly of the spray unit and/or of the heating unit can advantageously be achieved. Furthermore, the spray unit and the heating unit can be arranged in an installation space-saving manner, whereby it is moreover advantageously possible for an air resistance to be kept low during a wiping movement and for advantageous wiping properties to be achieved.

A "windshield wiper device" is to be understood as meaning in particular at least a part, in particular a subassembly, of a windshield wiper, wherein, in particular, accessory units for the windshield wiper may additionally also be comprised. In particular, the windshield wiper device may also comprise the entire windshield wiper. A "wiper blade adapter" is to be understood as meaning in particular an adapter which preferably has a region of contact with respect to a wiper blade component, in particular a wiper strip and/or at least one spring rail, and which is preferably captively connected to the wiper blade component and which is provided in particular for providing a region of coupling of the wiper blade component for coupling to and/or placement in contact with a wiper arm adapter. A "wiper arm adapter" is to be understood in this context as meaning in particular an adapter which has a region of contact with respect to a wiper arm and which is preferably captively connected to the wiper arm and which is provided in particular for providing a region of coupling of the wiper arm for coupling to and/or placement in contact with the wiper blade adapter. Preferably, the wiper arm adapter is connected at least partially in a force- and/or form-fitting manner to the wiper arm, and/or is formed at least partially integrally with the wiper arm. "At least partially integrally" is to be understood in this context as meaning in particular that at least one component of at least one object, and/or at least one first object, is formed integrally with at least one component of at least one further object and/or integrally with at least one further object. "Integrally" is to be understood as meaning in particular connected at least in a materially bonded manner, for example by a welding process, an adhesive bonding process, an injection molding process and/or some other process which appears to be expedient to a person skilled in the art, and/or as meaning advantageously formed in one piece.

A "coupling element" is to be understood as meaning in particular a component which is provided for being coupled, in an assembled state, in a force- and/or form-fitting manner, and preferably in a releasable manner, in particular to a further coupling element which is formed in a manner corresponding to the coupling element. In particular, the coupling element is provided for connecting in a force- and/or form-fitting and preferably releasable manner an object which is connected in a force- and/or form-fitting or materially bonded manner to the coupling element, in particular the wiper arm adapter, to an object which is connected in a force- and/or form-fitting manner to, or is formed at least partially integrally with, the further coupling element, in particular the wiper blade adapter. "Lateral coupling of the wiper arm adapter to the wiper blade adapter" is to be understood as meaning in particular that the wiper blade adapter and the wiper arm adapter are able to be coupled by means of a movement along a coupling axis, which is oriented in particular at least substantially perpendicular to a direction of longitudinal extent of the wiper blade adapter. In particular, the coupling axis is oriented substantially parallel to a direction of transverse extent of the wiper blade adapter. In particular, the coupling axis is oriented at least partially parallel to the vehicle windshield, in particular in a region of contact of the windshield wiper with the vehicle windshield. In particular, at least one coupling element of the wiper arm adapter engages at least partially into a side wall of the wiper blade adapter. Preferably, the coupling element of the wiper arm adapter engages into the coupling element of the wiper blade adapter. In particular, in an assembled state, at least the surface of a side wall of the wiper blade adapter is preferably in contact with at least the side wall of the wiper arm adapter. In particular, the coupling axis is oriented in particular substantially parallel to a direction of transverse extent of the wiper blade adapter. "At least substantially parallel" is to be understood here as meaning in particular an orientation of a direction relative to a reference direction, in particular in a plane, wherein, in relation to the reference direction, the direction deviates in particular by less than 8°, advantageously by less than 5° and particularly advantageously by less than 2°. A "direction of transverse extent" of an object, in particular the wiper blade adapter, is to be understood as meaning in particular a direction which is oriented perpendicular to a direction of longitudinal extent of the wiper blade adapter and in particular parallel to a vehicle windshield, in particular in the region of contact of the windshield wiper with the vehicle windshield. A "direction of longitudinal extent" of an object is to be understood as meaning in particular a direction which is oriented parallel to a longest side of a smallest imaginary geometrical cuboid which just completely encloses the object.

A "spray unit" is to be understood in this context as meaning in particular a unit which is provided in particular for spraying of a washing fluid onto the vehicle windshield. Preferably, the spray unit has at least one spray channel unit, which is preferably arranged in the wiper blade adapter, the wiper strip and/or the spoiler unit. In particular, the spray unit has, for the purpose of spraying, at least one spray nozzle element, which is preferably formed at least partially integrally with the spray channel unit. Moreover, the spray channel unit preferably has a spray channel connection element, which is provided in particular for supplying the washing fluid to the at least one spray nozzle element.

Additionally, the spray unit preferably has a further spray channel connection element, which is arranged in the wiper arm and/or the wiper arm adapter and is provided for supplying, in an assembled state, the washing fluid to the spray channel unit. A "heating unit" is to be understood as meaning in particular a unit which is provided for heating the washing fluid and/or the wiper blade. The heating unit has at least one heating element, which is preferably arranged in the wiper blade adapter, the wiper strip and/or the spoiler unit. The heating unit is preferably arranged at least partially substantially parallel to the spray channel unit of the spray unit.

It is moreover proposed that the spray unit has at least one spray channel connection element, which is connected at least partially to at least one coupling element and is provided for at least partially automatic coupling to a further spray channel connection element on the wiper blade adapter. An "at least partially automatic coupling" is to be understood as meaning in particular a coupling of two objects that is able to be effected without any external action, in particular action of force of an operator, in particular without plugging in, screwing, pressing, pushing and/or some other action which appears to be expedient to a person skilled in the art. In particular, by means of the lateral coupling of the wiper arm adapter to the wiper blade adapter, it is additionally possible for the coupling of the spray unit, in particular of the spray channel connection element, which is preferably connected at least partially in a force- and/or form-fitting or materially bonded manner to the coupling element of the wiper arm adapter, to be connected, preferably by means of a detent connection, to the further spray channel connection element, which is preferably connected at least partially in a force- and/or form-fitting or materially bonded manner to the coupling element of the wiper arm adapter. In particular, the detent connection of the spray channel connection element with respect to the further spray channel connection element is provided for being coupled, in particular at least partially automatically, during the coupling of the wiper arm adapter to the wiper blade adapter. The configuration according to the invention makes it possible for the spray unit to be arranged in a particularly installation space-saving manner. Moreover, it is advantageously possible for fitting of the spray channel connection element to the further spray channel connection element of the spray unit to be realized particularly easily.

It is furthermore proposed that the wiper arm adapter is arranged at least partially separately from the spray unit and/or the heating unit. In particular, the wiper arm adapter is connected in a force- and/or form-fitting manner and preferably integrally to the wiper arm and is preferably arranged in an end region of the wiper arm. Arranged "separately" is to be understood as meaning in particular that an object is arranged spaced apart from at least one further object. The configuration according to the invention advantageously makes it possible for the spray unit and, in particular the spray channel connection element of the spray unit, and/or the heating unit, in particular the heating connection element of the heating unit, to be arranged so as to be particularly easily accessible to an operator for the purpose of assembly, whereby in particular the spray channel connection element of the spray unit and/or the heating unit, in particular the heating connection element of the heating unit, can be connected particularly easily and manually to the wiper blade adapter.

It is furthermore proposed that the spray unit has at least one spray channel connection element, which is provided for at least partially manual coupling to the wiper blade adapter. An "at least partially manual coupling" is to be understood as meaning in particular a coupling of an object to a further object wherein external action, in particular action of force of an operator, applied to the object at least partially effects a coupling of the object to the further object. In particular, the spray channel connection element is at least partially in the form of a tube element which is provided for guidance of the washing fluid. Preferably, in addition, the heating unit has a heating connection element which is provided for at least partially manual coupling to the wiper blade adapter. The configuration according to the invention advantageously makes it possible for the spray unit and/or the heating unit to be connected particularly easily to the wiper blade adapter. Moreover, repair and/or maintenance expenditure for the spray unit, the heating unit and the windshield wiper device can be kept low.

It is furthermore proposed that the spray unit has at least one detent unit, which is provided for force- and/or form-fitting connection of the spray channel connection element to a spray channel unit of the spray unit in the wiper blade adapter. In particular, the detent unit has at least one detent element, which is formed in a force- and/or form-fitting or materially bonded, in particular integral, manner with respect to the spray channel connection element. Preferably, the detent unit has at least one further detent element, which is formed in a force- and/or form-fitting or materially bonded manner with respect to a further spray channel connection element of the wiper blade adapter and is provided for a detent connection with respect to the detent element of the spray channel connection element. Preferably, the further detent element is connected in a force- and/or form-fitting or materially bonded manner to the wiper blade adapter, in particular to a main body of the wiper blade adapter. The configuration according to the invention advantageously makes it possible for particularly simple assembly of the wiper arm adapter and of the spray unit to be achieved. Moreover, repair and/or maintenance expenditure for the spray unit can be kept low.

It is moreover proposed that the wiper blade adapter has a connection unit which is arranged on at least one side wall, extending transverse to a direction of longitudinal extent of the wiper blade adapter, and which is provided for connection to the spray channel connection element. In particular, the direction of longitudinal extent of the wiper blade adapter is oriented substantially parallel to a direction of longitudinal extent of the wiper blade. In particular, a surface of the side wall of the wiper blade adapter is oriented transverse to the direction of longitudinal extent. "Transverse" is to be understood here as meaning in particular "at least substantially perpendicular". "At least substantially perpendicular" is to be understood here as meaning in particular an orientation of a direction relative to a reference direction, in particular in a plane, wherein the direction and the reference direction include an angle which differs from a right angle by less than 8°, advantageously less than 5°, particularly advantageously less than 2°. The connection unit is provided in particular for connecting the spray channel connection element and/or the heating connection element to the wiper blade adapter, in particular to a further spray channel connection element and/or to the heating element of the heating unit. In particular, the connection unit is connected in a force- and/or form-fitting or materially bonded manner to a detent unit, in particular to the detent unit already mentioned, and forms a force- and/or form-fitting connection of the spray channel element and/or the heating connection element to the wiper blade adapter. The configuration according to the invention makes it possible in particular for particularly simple coupling of the spray channel connection element and/or of the heating connection element to be provided.

It is furthermore proposed that the heating unit has at least one heating connection element, which is provided for at least partially manual fitting to a heating element of the heating unit in the wiper blade adapter. In particular, the heating connection element is at least partially in the form of a connection cable which is provided for supply of electrical energy to the heating element of the heating unit. In particular, the heating connection element is preferably arranged at least partially separately from the spray channel connection element. The configuration according to the invention advantageously makes it possible for the spray unit and/or the heating unit to be connected particularly easily to the wiper blade adapter. Moreover, repair and/or maintenance expenditure for the heating unit and/or the windshield wiper device can be kept low.

It is furthermore proposed that the heating unit has at least one detent unit, which is provided for force- and/or form-fitting connection of the heating connection element to a heating element of the heating unit in the wiper blade adapter. In particular, the detent unit has at least one detent element, which is connected in a force- and/or form-fitting manner to the heating connection element or is formed at least partially integrally with the heating connection element. Preferably, the detent unit has at least one further detent element, which is connected in a force- and/or form-fitting or materially bonded manner to the heating element in the wiper blade adapter and is provided for a detent connection with respect to the detent element of the heating connection element. Preferably, the further detent element is connected in a force-fitting, materially bonded and/or form-fitting manner to the wiper blade adapter. It is conceivable for the detent unit of the heating unit to be connected at least partially integrally to the detent unit of the spray unit. It is conceivable for in particular the detent element on the spray channel connection element to be connected integrally to the detent element on the heating connection element. The configuration according to the invention advantageously makes it possible for particularly simple assembly of the wiper arm adapter of the heating unit to be achieved. Moreover, repair and/or maintenance expenditure for the heating unit can be kept low.

A windshield wiper having a windshield wiper device is moreover proposed. The configuration according to the invention of the windshield wiper makes it possible for particularly simple coupling of the wiper arm adapter to the wiper blade adapter to be achieved. Moreover, particular simple fitting of the wiper arm adapter to the wiper blade adapter can be achieved. Furthermore, simple assembly of the spray unit and/or of the heating unit can advantageously be achieved. Furthermore, the spray unit and the heating unit can be arranged in an installation space-saving manner, whereby it is moreover advantageously possible for an air resistance to be kept low during a wiping movement and for advantageous wiping properties to be achieved.

A method is moreover proposed, wherein, in at least one method step, after lateral coupling of the wiper arm adapter to the wiper blade adapter, spray channel connection elements of the spray unit and/or heating connection elements of the heating unit are connected. The configuration according to the invention of the windshield wiper device makes it possible for particularly simple coupling of the wiper arm adapter to the wiper blade adapter to be achieved. Moreover, particularly simple fitting of the wiper arm adapter to the wiper blade adapter can be achieved. Furthermore, it is advantageously possible for simple assembly of the spray unit and/or of the heating unit to be achieved. Furthermore, the spray unit and the heating unit can be arranged in an installation space-saving manner, whereby it is moreover advantageously possible for an air resistance to be kept low during a wiping movement and for advantageous wiping properties to be achieved.

Here, the windshield wiper device according to the invention and/or the method according to the invention are not intended to be restricted to the above-described usage and embodiment. In particular, the windshield wiper device according to the invention and/or the method according to the invention may, in order to realize a functionality described herein, have a number of individual elements, components and units and also method steps which differs from a number stated herein.

BRIEF DESCRIPTION OF THE DRAWINGS

Further advantages will emerge from the following description of the drawings. The drawings illustrate two exemplary embodiments of the invention. The drawings, the description and the claims contain numerous features in combination. A person skilled in the art will expediently also consider the features individually, and combine them to form meaningful further combinations.

In the drawing.

DETAILED DESCRIPTION

Figure 1:
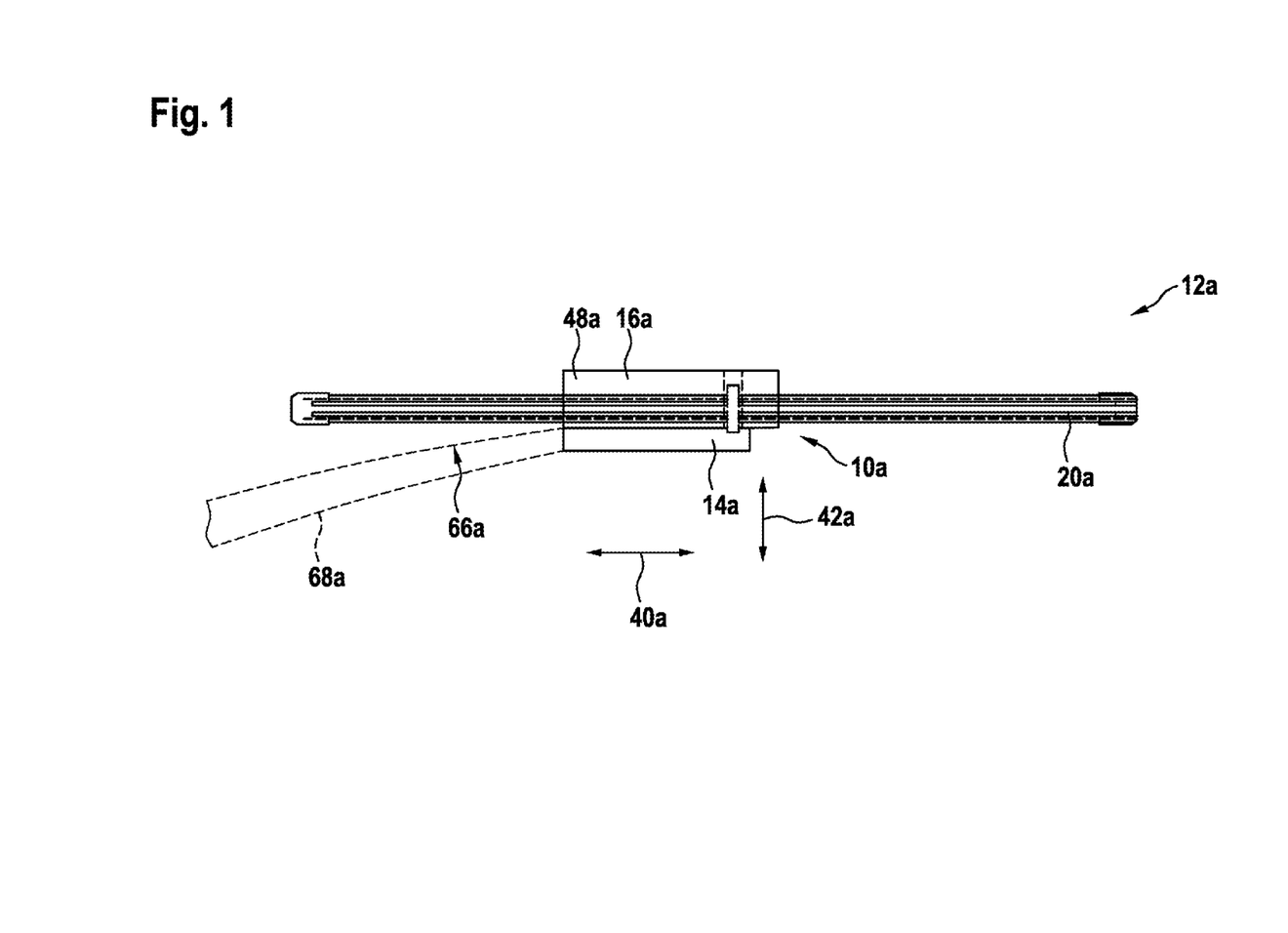
FIG. 1 shows a windshield wiper according to the invention with a windshield wiper device according to the invention in a simplified illustration from above.
Figure 2:
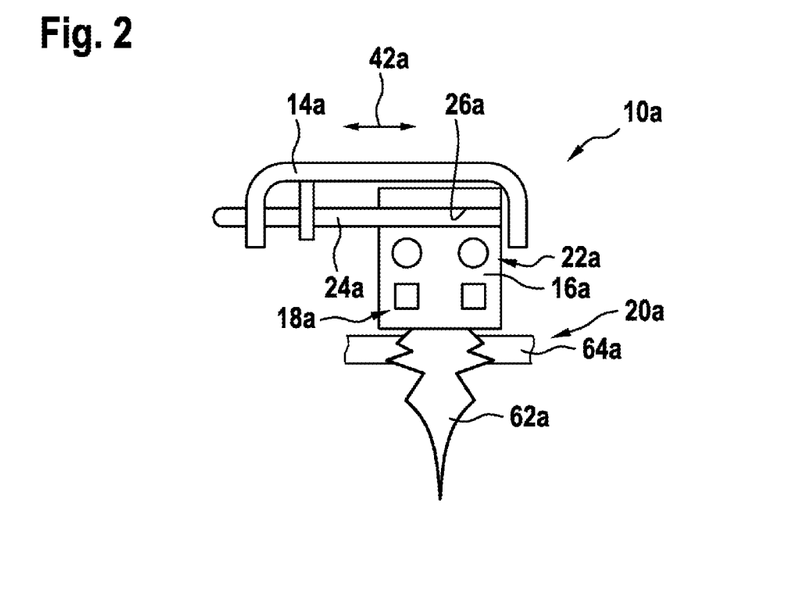
FIG. 2 shows the windshield wiper device according to the invention in a simplified illustration from above.

FIG. 1 shows a windshield wiper 12*a*. The windshield wiper 12*a* is provided for wiping a vehicle windshield of a vehicle. The windshield wiper 12*a* is in the form of a wind deflector windshield wiper. As additionally shown by FIG. 2 in a lateral illustration of the windshield wiper 12*a*, the windshield wiper 12*a* has at least one wiper blade 20*a*. The wiper blade 20*a* has at least one wiper strip 62*a*. The wiper strip 62*a*, in particular a wiper lip of the wiper strip 62*a*, is provided for being placed in contact with the vehicle windshield for the purpose of wiping the vehicle windshield. The windshield wiper 12*a* moreover has at least one spring rail 64*a*, which is provided for subjecting the wiper blade 20*a*, in particular the wiper strip 62*a*, to a tensioning force. Moreover, the wiper strip 62*a* has at least one spoiler unit (not shown here). The spoiler unit is arranged on a side of the wiper blade 20*a* that faces away from the vehicle windshield. Alternatively, it is also possible for the windshield wiper 12*a* to be of flat design in the form of a flat beam windshield wiper, wherein a spoiler unit could be dispensed with.

The windshield wiper 12*a* has a wiper arm 66*a* (cf. FIG. 1). The wiper arm 66*a* is rotatably mounted on a vehicle component. The wiper arm 66a is provided for subjecting the windshield wiper 12a, in particular the wiper blade 20a, to a wiping movement. The wiper arm 66a may have a wiper arm body (not shown here) and a wiper arm housing 68a. The wiper arm housing 68a delimits an interior space of the wiper arm 66a.

The windshield wiper 12a has a windshield wiper device 10a. The windshield wiper device 10a is provided for connecting the wiper arm 66a to the wiper blade 20a and/or to the wiper strip 62a. The windshield wiper device 10a is provided for releasable connection of the wiper arm 66a to the wiper blade 20a and/or to the wiper strip 62a. The windshield wiper device 10a is arranged on a side of the wiper strip 62a that faces away from the vehicle windshield. The windshield wiper device 10a is connected at least partially in a non-releasable manner to the wiper strip 62a. The windshield wiper device 10a is connected at least partially in a force- and/or form-fitting manner to the wiper arm 66a. Preferably, the windshield wiper device 10a is connected at least partially in a materially bonded manner to the wiper arm 66a. It is alternatively conceivable for the windshield wiper device 10a to be connected partially integrally to the wiper arm 66a. Moreover, it is alternatively conceivable for the windshield wiper device 10a to be connected in a releasable manner to the wiper strip 62a.

Figure 3:
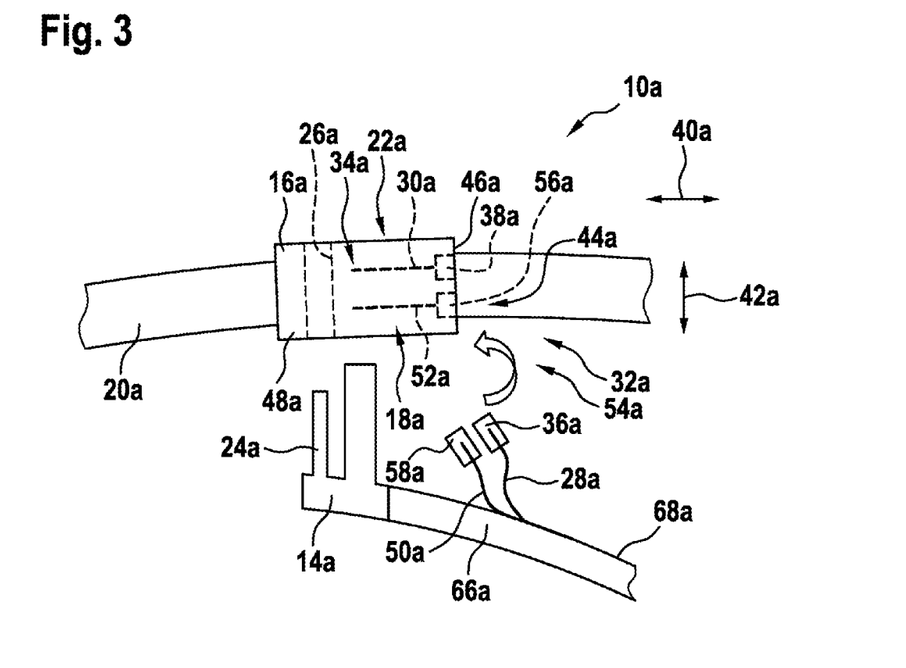
FIG. 3 shows the windshield wiper device according to the invention in a simplified illustration in a lateral sectional view, wherein the section plane is arranged perpendicular to a direction of longitudinal extent of the wiper blade adapter.

FIG. 3 shows the windshield wiper device 10a in a non-assembled stated in a view from above. The windshield wiper device 10a has a wiper arm adapter 14a. The wiper arm adapter 14a is provided for partially providing and/or forming a region of coupling of the wiper arm 66a to the wiper strip 62a and/or to the wiper blade 20a. The wiper arm adapter 14a is connected in a materially bonded manner to the wiper arm 66a. Alternatively, the wiper arm adapter 14a may be formed integrally with the wiper arm 66a or connected in a force- and/or form-fitting manner to the wiper arm 66a.

The wiper arm adapter 14a is provided for force- and/or form-fitting connection to a wiper blade adapter 16a of the windshield wiper device 10a. The wiper arm adapter 14a is provided for lateral coupling to the wiper blade adapter 16a. The wiper arm adapter 14a is in the form of a side lock wiper arm adapter 14a. The wiper arm adapter 14a has at least one coupling element 24a, which is provided for being connected, in an assembled state of the windshield wiper device 10a, to a further coupling element 26a of the wiper blade adapter 16a. The coupling element 24 is in the form of a bolt. The coupling element 24a has a longitudinal extent which is oriented perpendicular to a direction of longitudinal extent of the wiper arm 66a and/or, in an assembled state of the windshield wiper device 10a, perpendicular to a longitudinal extent of the wiper blade 20a. The coupling element 24a has a circular cross section. The cross section of the coupling element 24a is oriented perpendicular to the longitudinal extent of the coupling element 24a. Alternatively, the cross section may be formed to be elliptical, oval, polygonal or the like. The coupling element 24a, in the assembled state, engages at least partially into the wiper blade adapter 16a.

The windshield wiper device 10a has the wiper blade adapter 16a. The wiper blade adapter 16a has a direction of longitudinal extent 40a. The direction of longitudinal extent 40a, in particular in a wiping operation state, is oriented perpendicular to a wiping direction of the windshield wiper 12a in a region of contact of the windshield wiper 12a with the vehicle windshield. The direction of longitudinal extent 40a of the wiper blade adapter 16a is oriented parallel to the direction of longitudinal extent, in particular a main direction of extent, of the wiper blade 20a in a region of contact of the wiper blade adapter 16a with the wiper strip 62a. The direction of longitudinal extent 40a of the wiper blade adapter 16a forms the main direction of extent of the wiper blade adapter 16a. Alternatively, the main direction of extent may be configured to be perpendicular to the direction of longitudinal extent. The wiper blade adapter 16a has a direction of transverse extent 42a. The direction of transverse extent 42a of the wiper blade adapter 16a is oriented perpendicular to the direction of longitudinal extent 40a of the wiper blade adapter 16a. The direction of transverse extent 42a of the wiper blade adapter 16a is oriented parallel to the wiping direction of the windshield wiper 12a in a region of contact of the windshield wiper 12a on the vehicle windshield.

The wiper blade adapter 16a is provided for partially providing and/or forming a region of coupling of the wiper blade 20a to the wiper arm 66a. The wiper blade adapter 16a is captively connected to the wiper strip 62a. The wiper blade adapter 16a is connected in a force- and/or form-fitting manner to the wiper strip 62a. The wiper blade adapter 16a engages at least partially around the wiper strip 62a and/or at least one spring rail 64a. Alternatively, the wiper blade adapter 16a may be connected to the wiper strip 62a by means of a clamped connection, a detent connection, an, in particular releasable, rivet connection and/or by means of some other connection which appears to be expedient to a person skilled in the art.

The wiper blade adapter 16a has at least one main body 48a. The main body 48a forms at least one side wall 46a of the wiper blade adapter 16a, which is oriented perpendicular to the direction of longitudinal extent 40a of the wiper blade adapter 16a. The side wall 46a extends transverse to the direction of longitudinal extent 40a of the wiper blade adapter 16a.

The wiper blade adapter 16a is provided for force- and/or form-fitting connection to the wiper arm adapter 14a. The wiper blade adapter 16a is provided for lateral coupling to the wiper arm adapter 14a. The wiper blade adapter 16a is in the form of a side lock wiper blade adapter 16a. The wiper blade adapter 16a has a further coupling element 26a, which is provided for being coupled, in an assembled state of the windshield wiper device 10a, to the coupling element 24a of the wiper arm adapter 14a. The further coupling element 26a is in the form of a recess. The further coupling element 26a has a longitudinal extent which is oriented perpendicular to the direction of longitudinal extent 40a of the wiper blade adapter 16a. The longitudinal extent of the further coupling element 26a is oriented parallel to the longitudinal extent of the coupling element 24a of the wiper arm adapter 14a. The further coupling element 26a is formed in a manner corresponding to the coupling element 24a. The further coupling element 26a has a circular cross section. The cross section of the further coupling element 26a is oriented perpendicular to the longitudinal extent of the further coupling element 26a. Alternatively, the cross section of the further coupling element 26a may be formed to be elliptical, oval, polygonal or the like. The further coupling element 26a is provided for partially receiving, in the assembled state, the coupling element 24a of the wiper arm adapter 14a. The further coupling element 26a is provided for form-fitting mounting of the coupling element 26a. The further coupling element 26a is provided for rotatable mounting of the coupling element 24a. The coupling elements 24a, 26a form a rotation axle around which the wiper blade adapter 16a is mounted rotatably relative to the wiper arm adapter 14a. The rotation axle is oriented parallel to the longitudinal extent of the coupling element 24a and/or to the longitudinal extent of the further coupling element 26a.

In an assembled state, the wiper arm adapter 14a is arranged partially offset with respect to the wiper blade adapter 16a in a direction of transverse extent 42a of the wiper blade adapter 16a. In the assembled state, the coupling element 24a and the further coupling element 26a are arranged without an offset relative to one another in a direction of transverse extent 42a of the wiper blade adapter 16a. The wiper blade adapter 16a has at least one connection unit 44a. The connection unit 44a is provided for connection of the wiper blade adapter 16a to a spray unit 22a, in particular to a further spray channel connection element 28a of the spray unit 22a.

The windshield wiper device 10a has the spray unit 22a. The spray unit 22a is provided for spraying, in a wiping operation state, a washing fluid onto the vehicle windshield to be wiped. The spray unit 22a has at least one spray channel unit 34a for this purpose. The spray channel unit 34a is arranged partially within the wiper blade adapter 16a. The spray channel unit 34a is partially enclosed by the main body 48a of the wiper blade adapter 16a.

The spray channel unit 34a has at least one spray channel connection element 30a, which is arranged for guidance of the washing fluid within the wiper blade adapter 16a. The spray channel connection element 30a is provided for feeding the washing fluid to the at least one spray nozzle element.

The spray unit 22a has at least the spray nozzle element for spraying of the washing fluid onto the vehicle windshield. The spray nozzle element is connected at least partially integrally to the spray channel connection element 30a. The spray unit 22a has the further spray channel connection element 28a. The spray channel connection element 28a is in the form of a tube element. The spray channel connection element 28a is provided for feeding the washing fluid to the spray channel unit 34a. The spray channel connection element 28a is connected at least in a force- and/or form-fitting manner to the wiper arm 66a. It is also conceivable for the spray channel connection element 28a to be connected in a materially bonded manner to the wiper arm 66a. The spray channel connection element 28a is arranged partially within the wiper arm housing 68a. The spray channel connection element 28a is arranged partially in an outer region of the wiper arm housing 68a. The spray unit 22a is arranged separately from the wiper arm adapter 14a. The further spray channel connection element 28a is provided for being connected, in the assembled state, to the wiper blade adapter 16a. The further spray channel connection element 28a is provided for being connected, in the assembled state, to the spray channel unit 34a, in particular to the spray channel connection element 30a. The further spray channel connection element 28a is provided for manual coupling to the wiper blade adapter 16a. The further spray channel connection element 28a is provided for manual coupling to the spray channel unit 34a, in particular to the spray channel connection unit 30a of the wiper blade adapter 16a.

The spray unit 22a has a detent unit 32a. The detent unit 32a is formed integrally with the connection unit 44a. Alternatively, the detent unit 32a may be formed and/or arranged separately from the connection unit 44a. The detent unit 32a has a detent element 38a. The detent element 38a is formed in a force- and/or form-fitting manner with respect to the spray channel connection element 30a. The detent unit 32a has a further detent element 36a. The further detent element 36a is connected in a force- and/or form-fitting manner to the further spray channel connection element 28a. The detent element 38a and the further detent element 36a are provided for a detent connection with respect to one another. The detent element 38a and the further detent element 36a are provided for connection of the spray channel connection element 30a, in particular of the spray channel unit 34a, to the further spray channel connection element 28a.

The windshield wiper device 10a has a heating unit 18a. The heating unit 18a is provided for heating, in a wiping operation state, the washing fluid. The heating unit 18a is provided for heating, in a wiping operation state, the wiper blade 20a. The heating unit 18a has at least one heating element 52a. The heating element 52a is in the form of an electrical heating element 52a. The heating element 52a is arranged partially in the wiper blade adapter 16a, in particular the main body 48a of the wiper blade adapter 16a. The heating element 52a is surrounded partially by a main body 48a of the wiper blade adapter 16a.

The heating unit 18a has a heating connection element 50a. The heating connection element 50a is provided for supply of electrical energy to the heating element 52a. The heating connection element 50a is in the form of a connection cable or connection wire. The heating connection element 50a is arranged on the wiper arm 66a. The heating connection element 50a is arranged separately from the wiper arm adapter 14a. The heating connection element 50a is arranged partially within the wiper arm housing 68a. The heating connection element 50a is arranged partially in an outer region of the wiper arm housing 68a. The heating connection element 50a preferably has a protective element, for example a protective shell and/or a protective layer, which is provided for protecting the heating connection element 50a of the heating unit 18a against contact with a fluid. In particular, the heating connection element 50a is arranged separately from the spray channel connection element 28a. The heating connection element 50a is provided for manual fitting to a heating element 52a of the heating unit 18a in the wiper blade adapter 16a.

The heating unit 18a has a further detent unit 54a. The further detent unit 54a is formed partially integrally with the connection unit 44a. Alternatively, the further detent unit 54a may be connected in a materially bonded manner to the connection unit 44a or be formed separately from the connection unit 44a. The further detent unit 54a has an additional detent element 56a. The additional detent element 56a is formed in a force- and/or form-fitting manner with respect to the heating element 52a. The detent unit 54a has a further additional detent element 58a. The further additional detent element 58a is connected in a force- and/or form-fitting manner to the heating connection element 50a. The additional detent element 56a and the further additional detent element 58a are provided for a detent connection with respect to one another. The additional detent element 56a and the further additional detent element 58a are provided for connection of the heating connection element 50a to the heating element 52a.

Figure 4:
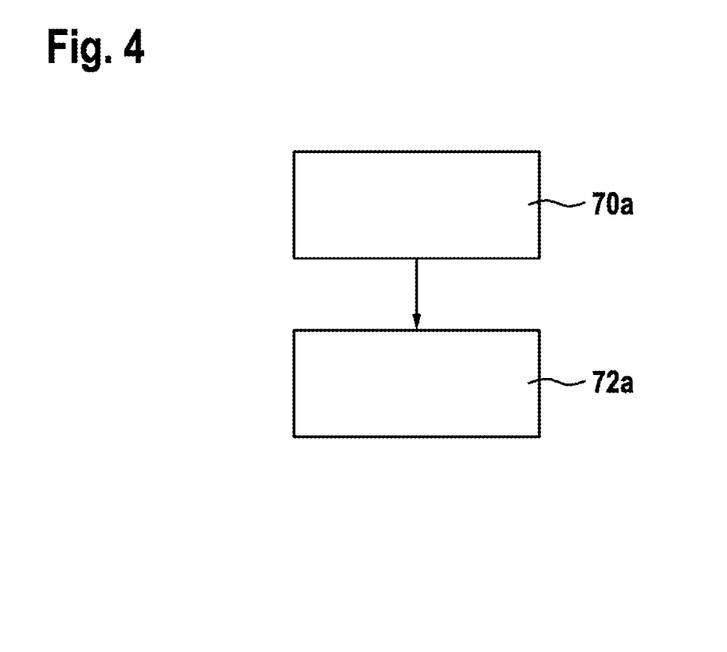
FIG. 4 shows a method according to the invention for assembling the windshield wiper device according to the invention in a highly simplified process illustration.

FIG. 4 shows a method for assembling the windshield wiper device 10a. The method for assembling the windshield wiper device 10a has at least one method step 70a. In the method step 70a, the wiper arm adapter 14a is coupled laterally to the wiper blade adapter 16a. The coupling element 24a of the wiper arm adapter 14a is coupled laterally to the further coupling element 26a of the wiper blade adapter 16a.

The method for assembling the windshield wiper device 10a has at least one further method step 72a. In the further method step 72*a*, the further spray channel connection element 28*a* is connected to the spray channel connection element 30*a*. Additionally, in the further method step 72*a*, the heating connection element 50*a* may be connected to the heating element 52*a*.

The method for assembling the windshield wiper device 10*a* is not restricted to the stated method steps and/or a sequence of the method steps. In particular, the method may have a number of method steps that differs from the stated number of method steps.

Figure 5:
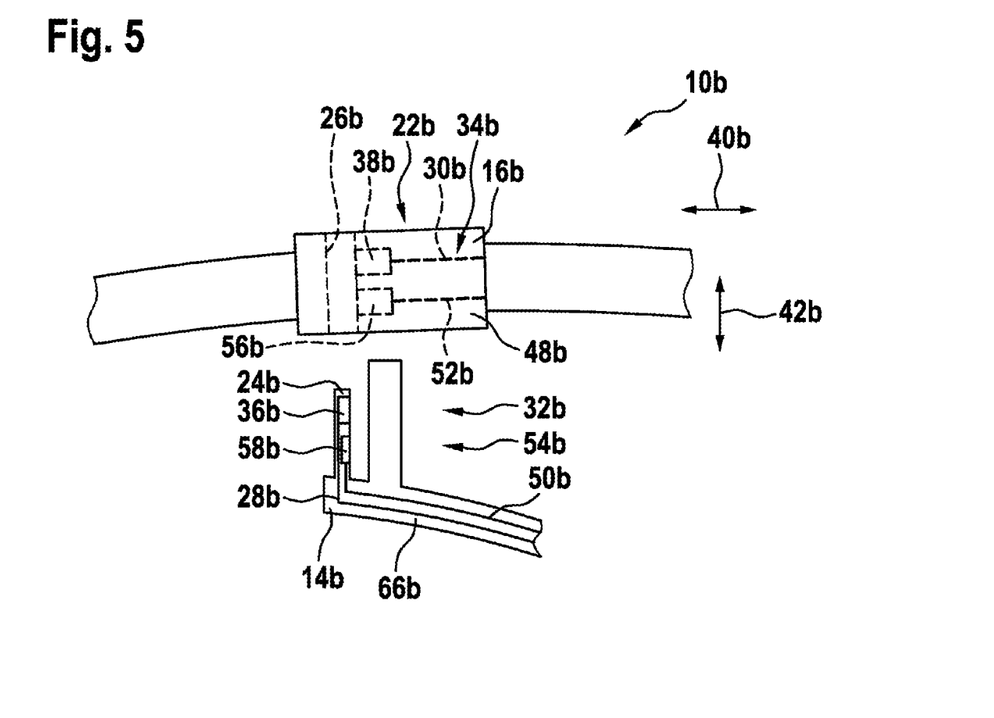
FIG. 5 shows a further exemplary embodiment of the windshield wiper device in a simplified illustration from above.

FIG. 5 shows a further exemplary embodiment of the invention. The following descriptions and the drawing are restricted essentially to the differences between the exemplary embodiments, wherein, with regard to components of identical designation, in particular with regard to components with the same reference signs, reference may basically also be made to the drawings and/or to the description of the other exemplary embodiment, in particular in FIGS. 1 to 4. For the purpose of distinguishing between the exemplary embodiments, the letter a has been placed after the reference signs of the exemplary embodiment in FIGS. 1 to 4. In the exemplary embodiment in FIG. 5, the letter a has been replaced by the letter b.

FIG. 5 shows a further exemplary embodiment of a windshield wiper device 10*b*. The windshield wiper device 10*b* is part of a windshield wiper 12*b*. The windshield wiper device 10*b* has a wiper arm adapter 14*b*. The wiper arm adapter 14*b* has a coupling element 24*b*. The windshield wiper device 10*b* has a wiper blade adapter 16*b*. The wiper blade adapter 16*b* has a main body 48*b*. The wiper blade adapter 16*b* has a further coupling element 26*b*. The further coupling element 26*b* of the wiper blade adapter 16*b* and the coupling element 24*b* of the wiper arm adapter 14*b* are provided for lateral coupling, in particular side lock coupling, of the wiper arm adapter 14*b* to the wiper blade adapter 16*b*.

The windshield wiper device 10*b* has a spray unit 22*b*. The spray unit 22*b* has a spray channel unit 34*b*. The spray channel unit 34*b* is arranged partially in the wiper blade adapter 16*b*. The spray channel unit 34*b* has a spray channel connection element 30*b*. The spray channel connection element 30*b* is arranged in the wiper blade adapter 16*b*. The spray channel connection element 30*b* is connected to the further coupling element 26*b*. The spray unit 22*b* has a further spray channel connection element 28*b*. The further spray channel connection element 28*b* is arranged partially within a wiper arm 66*b* of the windshield wiper 12*b*. The further spray channel connection element 28*b* is arranged partially in the wiper arm adapter 14*b*. The further spray channel connection element 28*b* is connected to the coupling element 24*b*. The further spray channel connection element 28*b*, in particular by contrast to the first exemplary embodiment, is arranged at least partially in the coupling element 24*b*.

The spray channel connection element 30*b* of the wiper blade adapter 16*b* and the further spray channel connection element 28*b* of the wiper arm adapter 14*b* are provided for automatic coupling with coupling of the wiper arm adapter 14*b* to the wiper blade adapter 16*b*. The spray channel connection element 30*b* of the wiper blade adapter 16*b* and the further spray channel connection element 28*b* of the wiper arm adapter 14*b* are provided for automatic coupling with coupling of the further coupling element 26*b* to the coupling element 24*b*.

It is conceivable for the spray unit 22*b* to have a detent unit 32*b* which has a detent element 36*b*, which is connected in a force- and/or form-fitting or materially bonded manner to the spray channel connection element 30*b*, and/or has a further detent element 38*b*, which is connected in a force- and/or form-fitting or materially bonded manner to the further spray channel connection element 28*b*, wherein the detent element 36*b* and the further detent element 38*b* are provided in particular for being connected, in an assembled state, to one another in a force- and/or form-fitting manner. It is moreover conceivable for the windshield wiper device 10*b* to have a heating unit 18*b*, with the heating unit 18*b* having a heating element 52*b*, which is arranged in the wiper blade adapter 16*b*, and having a heating connection element 50*b*, which is arranged partially in the coupling element 24*b* of the wiper arm adapter 14*b*. The heating unit 18*b* has a further detent unit 54*b*, which has an additional detent element 56*b*, which is connected in a force- and/or form-fitting or materially bonded manner to the heating element 52*b*, and/or has a further additional detent element 58*b*, which is connected in a force- and/or form-fitting or materially bonded manner to the heating connection element 50*b*, wherein the additional detent element 56*b* and the further additional detent element 58*b* are provided in particular for being connected to one another in a force- and/or form-fitting manner for the purpose of assembly.

The invention claimed is:

1. A windshield wiper device (10*a*; 10*b*) for a windshield wiper (12*a*; 12*b*), the windshield wiper device (10*a*, 10*b*) having at least one wiper arm adapter (14*a*; 14*b*), having at least one wiper blade adapter (16*a*; 16*b*), and having a heating unit (18*a*; 18*b*) for heating a wiper blade (20*a*; 20*b*) and/or having a spray unit (22*a*; 22*b*) for spraying a washing fluid onto a vehicle windshield, wherein the spray unit (22*a*; 22*b*) and/or the heating unit (18*a*; 18*b*) are/is arranged at least partially in the wiper blade adapter (16*a*; 16*b*), characterized in that the wiper arm adapter (14*a*; 14*b*) and the wiper blade adapter (16*a*; 16*b*) have coupling elements (24*a*, 26*a*; 24*b*, 26*b*) configured for lateral coupling of the wiper arm adapter (14*a*; 14*b*) to the wiper blade adapter (16*a*; 16*b*).

2. The windshield wiper device (10*b*) as claimed in claim 1, characterized in that the spray unit (22*b*) has at least one spray channel connection element (28*b*), which is connected at least partially to at least one coupling element (24*b*, 26*b*) and is configured for at least partially automatic coupling to a further spray channel connection element (30*b*) on the wiper blade adapter (16*b*).

3. The windshield wiper device (10*a*) as claimed in claim 1, characterized in that the wiper arm adapter (14*a*) is arranged at least partially separately from the spray unit (22*a*) and/or the heating unit (18*a*).

4. The windshield wiper device (10*a*) as claimed in claim 1, characterized in that the spray unit (22*a*) has at least one spray channel connection element (28*a*), which is configured for at least partially manual coupling to the wiper blade adapter (16*a*).

5. The windshield wiper device (10*a*) as claimed in claim 4, characterized in that the spray unit (22*a*) has at least one detent unit (32*a*), which is configured for force- and/or form-fitting connection of the spray channel connection element (28*a*) to a spray channel unit (34*a*) of the spray unit (22*a*) in the wiper blade adapter (16*a*).

6. The windshield wiper device (10*a*) as claimed in claim 4, characterized in that the wiper blade adapter (16*a*) has a connection unit (44*a*) which is arranged on at least one side wall (46*a*), extending transverse to a direction of longitudinal extent (40*a*) of the wiper blade adapter (16*a*), and which is configured for connection to the spray channel connection element (28*a*).

7. The windshield wiper device (10a) as claimed in claim 1, characterized in that the heating unit (18a) has at least one heating connection element (50a), which is configured for at least partially manual fitting to a heating element (52a) of the heating unit (18a) in the wiper blade adapter (16a).

8. The windshield wiper device (10a) as claimed in claim 7, characterized in that the heating unit (18a) has at least one detent unit (54a), which is configured for force- and/or form-fitting connection of the heating connection element (50a) to a heating element (52a) of the heating unit (18a) in the wiper blade adapter (16a).

9. A windshield wiper (12a; 12b) having a windshield wiper device (10a; 10b) as claimed in claim 1.

10. A method for assembling a windshield wiper device (10a; 10b) as claimed in claim 1, the method comprising laterally coupling the wiper arm adapter (14a) to the wiper blade adapter (16a), and connecting the spray channel connection elements (28a, 30a) of the spray unit (22a) and/or heating connection elements (50a) of the heating unit (18a).

11. A windshield wiper device (10a; 10b) for a windshield wiper (12a; 12b), the windshield wiper device (10a; 10b) having at least one wiper arm adapter (14a; 14b), having at least one wiper blade adapter (16a; 16b), and having a spray unit (22a; 22b) for spraying a washing fluid onto a vehicle windshield, wherein the spray unit (22a; 22b) is arranged at least partially in the wiper blade adapter (16a; 16b), characterized in that the wiper arm adapter (14a; 14b) and the wiper blade adapter (16a; 16b) have coupling elements (24a, 26a; 24b, 26b) configured for lateral coupling of the wiper arm adapter (14a; 14b) to the wiper blade adapter (16a; 16b).

12. The windshield wiper device (10b) as claimed in claim 11, characterized in that the spray unit (22b) has at least one spray channel connection element (28b), which is connected at least partially to at least one coupling element (24b, 26b) and is configured for at least partially automatic coupling to a further spray channel connection element (30b) on the wiper blade adapter (16b).

13. The windshield wiper device (10a) as claimed in claim 11, characterized in that the wiper arm adapter (14a) is arranged at least partially separately from the spray unit (22a).

14. The windshield wiper device (10a) as claimed in claim 11, characterized in that the spray unit (22a) has at least one spray channel connection element (28a), which is configured for at least partially manual coupling to the wiper blade adapter (16a).

15. The windshield wiper device (10a) as claimed in claim 14, characterized in that the spray unit (22a) has at least one detent unit (32a), which is configured for force- and/or form-fitting connection of the spray channel connection element (28a) to a spray channel unit (34a) of the spray unit (22a) in the wiper blade adapter (16a).

16. The windshield wiper device (10a) as claimed in claim 14, characterized in that the wiper blade adapter (16a) has a connection unit (44a) which is arranged on at least one side wall (46a), extending transverse to a direction of longitudinal extent (40a) of the wiper blade adapter (16a), and which is configured for connection to the spray channel connection element (28a).

17. A windshield wiper device (10a; 10b) for a windshield wiper (12a; 12b), the windshield wiper device (10a; 10b) having at least one wiper arm adapter (14a; 14b), having at least one wiper blade adapter (16a; 16b), and having a heating unit (18a; 18b) for heating a wiper blade (20a; 20b), wherein the heating unit (18a; 18b) is arranged at least partially in the wiper blade adapter (16a; 16b), characterized in that the wiper arm adapter (14a; 14b) and the wiper blade adapter (16a; 16b) have coupling elements (24a, 26a; 24b, 26b) configured for lateral coupling of the wiper arm adapter (14a; 14b) to the wiper blade adapter (16a; 16b).

18. The windshield wiper device (10a) as claimed in claim 17, characterized in that the heating unit (18a) has at least one heating connection element (50a), which is configured for at least partially manual fitting to a heating element (52a) of the heating unit (18a) in the wiper blade adapter (16a).

19. The windshield wiper device (10a) as claimed in claim 18, characterized in that the heating unit (18a) has at least one detent unit (54a), which is configured for force- and/or form-fitting connection of the heating connection element (50a) to a heating element (52a) of the heating unit (18a) in the wiper blade adapter (16a).

20. The windshield wiper device (10a) as claimed in claim 17, characterized in that the wiper arm adapter (14a) is arranged at least partially separately from the heating unit (18a).

* * * * *